United States Patent [19]
Braunberger et al.

[11] 3,804,279
[45] Apr. 16, 1974

[54] DRIVE MECHANISM FOR FORAGE WAGON

[75] Inventors: Benjamin A. Braunberger; Donald E. Burrough, both of West Bend, Wis.

[73] Assignee: Gehl Company, West Bend, Wis.

[22] Filed: Sept. 15, 1972

[21] Appl. No.: 289,762

[52] U.S. Cl............... 214/519, 214/83.14, 198/203
[51] Int. Cl............................................. B60p 1/38
[58] Field of Search............ 214/83.14, 83.36, 519, 214/520, 521, 522; 198/203

[56] References Cited
UNITED STATES PATENTS

| | | | |
|---|---|---|---|
| 3,595,289 | 7/1971 | Greiner | 214/519 X |
| 3,189,202 | 6/1965 | Hansen | 214/519 X |
| 3,286,862 | 11/1966 | Hansen | 214/519 |
| 2,642,174 | 6/1953 | Buccicone | 198/208 X |
| 3,275,176 | 9/1966 | Kasten | 214/83.14 X |
| 3,214,050 | 10/1965 | McConeghy, Jr. | 214/83.14 X |

*Primary Examiner*—Albert J. Makay
*Attorney, Agent, or Firm*—James E. Nilles

[57] ABSTRACT

A self-unloading forage wagon has a beater, a main conveyor and a discharge or cross conveyor which are driven from a power input shaft (connected to the power take-off shaft of a tractor) to forceably discharge material from the wagon. The discharge conveyor is driven by a first drive chain arranged in the form of a figure eight to effect direction reversal between the tractor power take-off and the discharge conveyor. The beater and main conveyor are driven by a second drive chain connected between the power input shaft and a safety clutch mechanism. The speed selector mechanism comprises a beater drive shaft which runs at constant speed and a main conveyor drive shaft which can run at any of three speeds ( low, sweep or high). Three separate power transmitting means, each comprising flexible endless chain and sprockets, are interconnected between the beater drive shaft and the main conveyor drive shaft and are operable by means of a three-speed selector clutch having low speed, sweep speed and high speed positions. With the speed-selector clutch in low speed position, one power transmitting means comprising an overrunning clutch, drives the main conveyor drive shaft and the main conveyor at low speed. With the speed-selector clutch in either sweep speed or high speed position, the overrunning clutch in the aforesaid one power transmitting means automatically disengages, and the main conveyor is driven at either sweep speed or high speed by either of the other two power transmitting means, whichever is selected, while the beater is still driven at constant speed.

8 Claims, 13 Drawing Figures

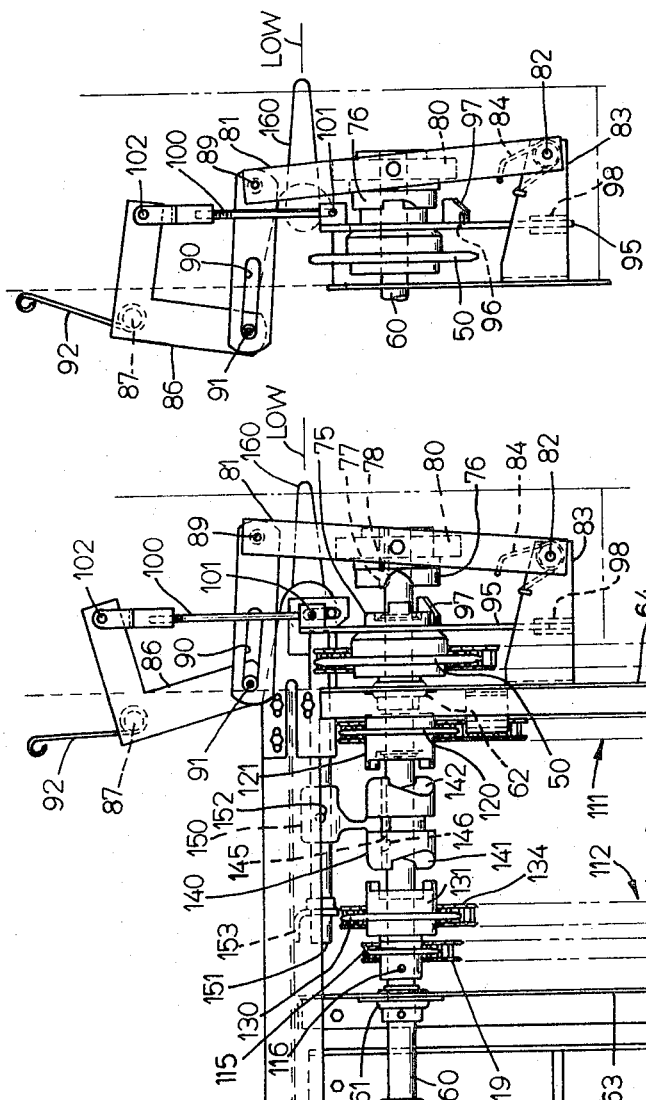
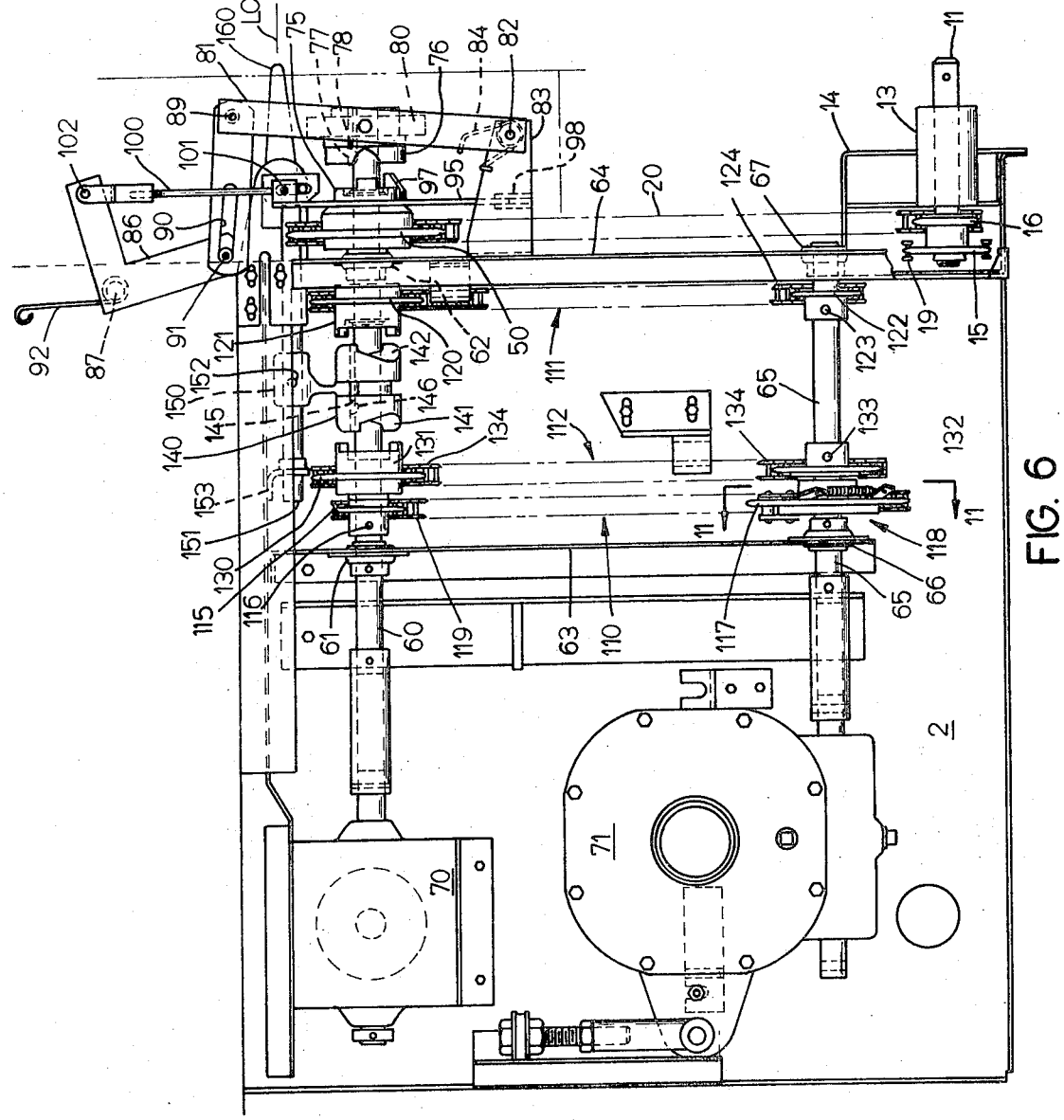
FIG. 7
FIG. 6

DRIVE MECHANISM FOR FORAGE WAGON

BACKGROUND OF THE INVENTION

1. Field of Use

This invention relates generally to self-unloading forage wagons of the type which have driven beaters, main conveyors and cross conveyors which operate to forceably discharge material from the wagon. In particular it relates to drive mechanisms for the beaters and conveyors.

2. Description of the Prior Art

A forage wagon of the aforesaid character is disclosed in U.S. Pat. No. 3,161,269, issued Dec. 15, 1964 to Janssen for "Cam Operated Clutch for Forage Wagons" and assigned to the same assignee as the present application. The utility, versatility and efficiency of this and other prior art type forage wagons can be substantially increased. For example, many prior art forage wagons are powered by a tractor power take-off, the direction of which runs opposite to that required by the conventional discharge or cross conveyor. Usually, the required direction reversal was accomplished by an expensive gear box or a twisted belt which has size and reliability disadvantages. It is desirable, therefore, to improve the power input means which connect to the power take-off shaft of a tractor or other power source which furnishes operating power to the forage wagon. Furthermore, it is desirable to improve the clutch mechanism which connects the power input means to the beater and main conveyor to enable simple, reliable, safe, multi-speed operation of the main conveyor with respect to the beater.

SUMMARY OF THE PRESENT INVENTION

The present invention contemplates a self-unloading forage wagon which has a beater, a main conveyor and a discharge or cross conveyor which are driven from a power input shaft to forceably discharge material from the wagon. The power input shaft is driven by a power take-off shaft of a tractor. In accordance with one aspect of the present invention, the discharge conveyor is driven by a first drive chain arranged in the form of a figure-eight and connected between a first drive sprocket on the power input shaft and a driven sprocket on the discharge conveyor. Arrangement of the first drive chain in the form of a figure-eight provides for necessary direction reversal between a conventional tractor power take-off shaft and the desired direction of the discharge or cross conveyor. In accordance with another aspect of the invention, the beater and main conveyor are driven by a second drive chain connected between a second driven sprocket on the power input shaft and a driven sprocket which is part of a speed selector mechanism. The speed selector mechanism comprises a beater drive shaft which can run at constant low speed (constant with respect to tractor power take-off speed) and a main conveyor drive shaft which can run at any of three selected speeds (low, sweep or high speed). The aforesaid driven sprocket free-wheels on the beater drive shaft until it is selectively engaged by means of an on-off mechanism to rotate the beater drive shaft at low speed. Three separate power transmitting means, each comprising a flexible endless chain and sprockets, are interconnected between the beater drive shaft and the main conveyor drive shaft and are alternatively operable by means of a three-speed selector clutch which has low speed, sweep speed and high speed positions. With the speed-selector clutch in low speed position, one of the aforesaid power transmitting means, which comprises an overrunning clutch, drives the main conveyor at constant speed. With the speed-selector clutch in either sweep speed or high speed position, the overrunning clutch in the aforesaid one power transmitting means automatically disengages, and the main conveyor is driven at either sweep speed or high speed, whichever is selected, while the beater is still driven at constant speed.

A forage wagon and drive mechanism therefor in accordance with the invention has several advantages. For example, it is adapted for use with conventional tractor power take-off means by a simple, economical, reliable drive means. Furthermore, it is adapted to operate a wider range of speeds by means of a relatively safe and uncomplicated speed selector mechanism.

These and other objects and advantages of the present invention will appear hereinafter as this disclosure progresses, reference being had to the accompanying drawings.

BRIEF DESCRIPTION OF THE DRAWINGS

FIG. 6 is a side elevational view of the drive mechanism on the right side of the wagon showing the manual control inkage in low speed, clutch-disengaged position;

FIG.7 is a side view of a portion of the drive mechanism of FIG. 6 showing the manual control linkage in beater drive shaft clutch engaged position;

DESCRIPTION OF A PREFERRED EMBODIMENT

Figure 1:
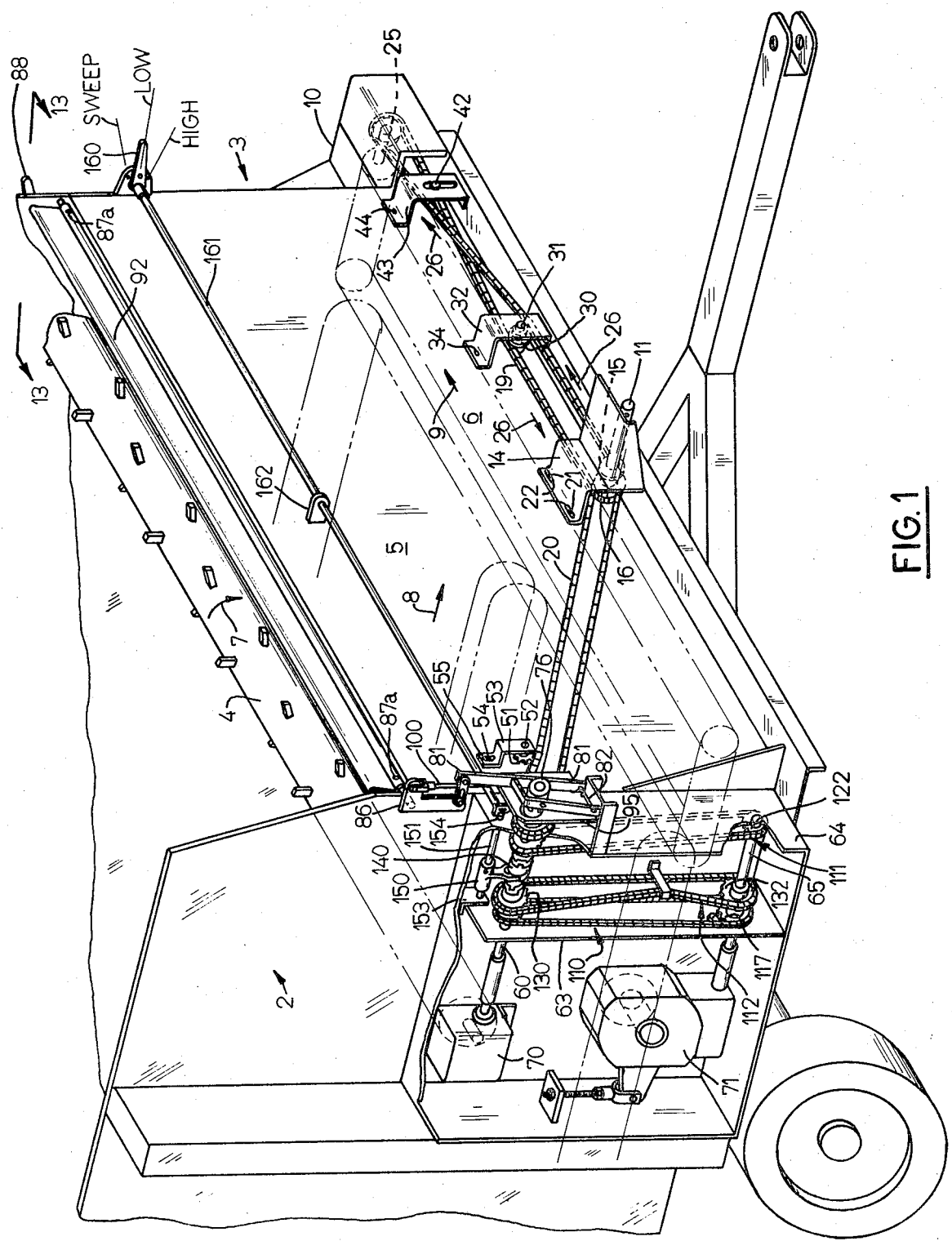
FIG. 1 is a perspective view of the front and right side of a forage wagon in accordance with the present invention.

FIG. 1 shows a forage wagon in accordance with the invention which comprises two sides 2 and 3 between which one or more rotary beaters, such as 4, an endless belt main conveyor 5 and an endless belt discharge or cross conveyor 6 are mounted. The working surfaces of the components 4, 5 and 6 operate in the direction of the arrows 7, 8 and 9, respectively, and the beater 4 is adapted to tear apart material (such as compacted forage) being conveyed toward the front end of the wagon by the conveyor 5 for delivery onto discharge conveyor 6 for discharge through an opening 10 on side 3 of the wagon.

Figure 2:
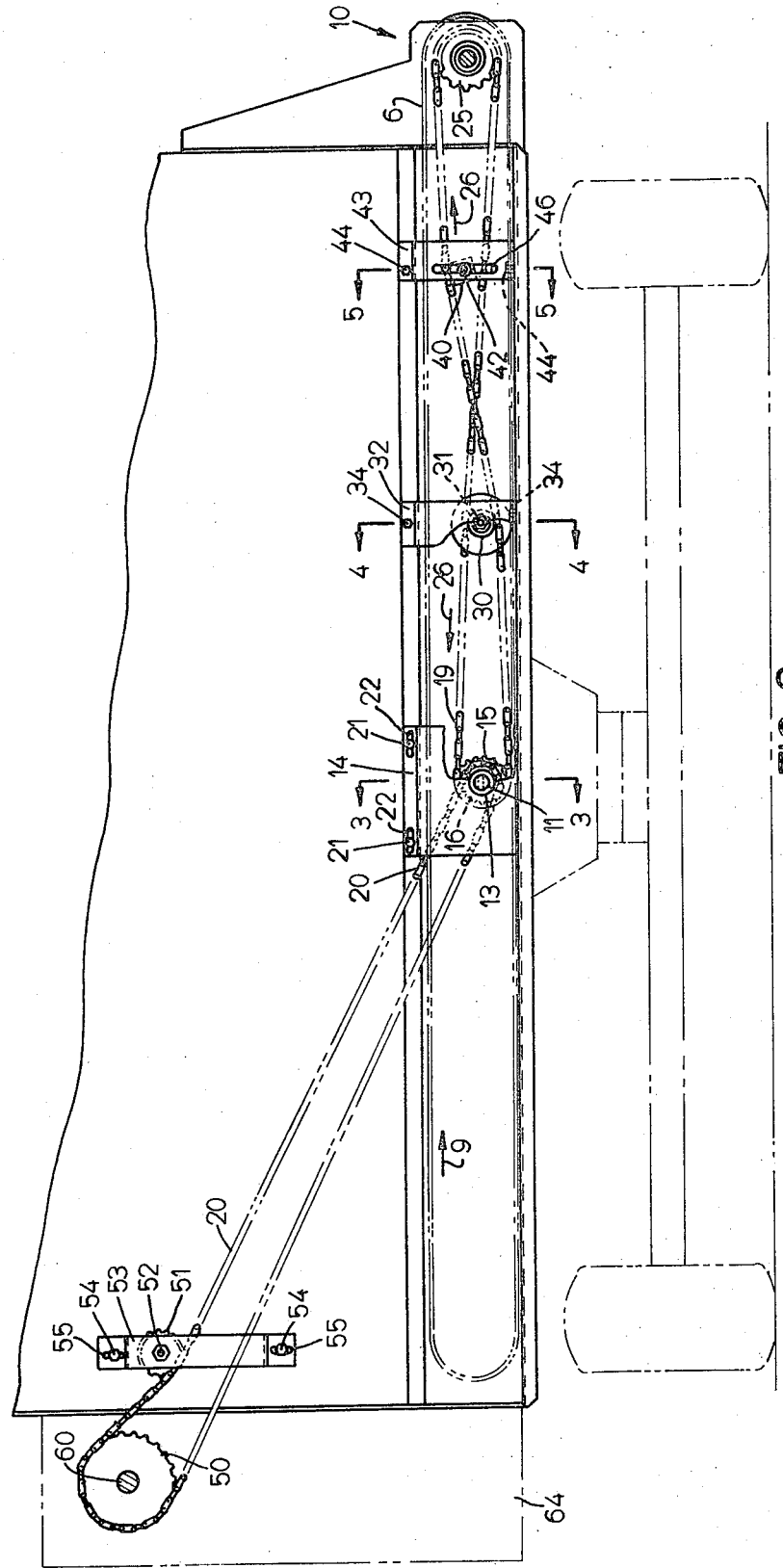
FIG. 2 is an elevational view of the front of the wagon shown in FIG. 1.
Figure 3:
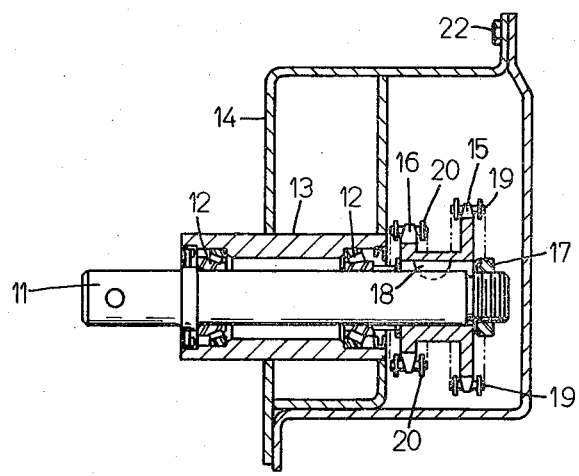
FIG. 3 is a cross-section view taken on line 3—3 of FIG. 2 and showing the power input shaft of the wagon.
Figure 4:
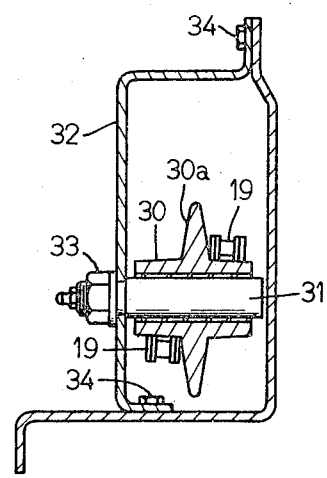
FIG. 4 is a cross-section view taken on line 4—4 of FIG. 2 and showing the chain guide wheel for the discharge conveyor drive chain.

Power for driving beater 4 and the conveyors 5 and 6 is provided by a power input shaft 11 at the front of the wagon, which is adapted to be connected to the conventional power take-off shaft of a tractor (not shown). Referring to FIGS. 1, 2, 3 and 6, shaft 11 is journalled for rotation in a pair of bearings 12 which are mounted in a sleeve 13 rigidly attached to a laterally adjustable support bracket 14 on the front of the wagon. Bracket 14 is laterally adjustable to properly position shaft 11 on the front of the wagon by means of the mounting screws 21 which extend through elongated slots 22 in bracket 14, as FIG. 2 shows. A sprocket assembly comprising a cross conveyor drive sprocket 15 and a power transmission drive sprocket 16 is secured to shaft 11 by a nut 17 and key 18, as FIG. 3 shows. Sprocket 15 drives a cross conveyor drive chain 19 and sprocket 16 drives a power transmission drive chain 20. Chain 19 furnishes drive power to discharge or cross conveyor 6 and chain 20 furnishes drive power to beater 4 and main conveyor 5, as hereinafter described.

As FIGS. 1, 2, 3, 4 and 5 show, cross conveyor drive chain 19 runs around cross conveyor drive sprocket 15 and around a cross conveyor driven sprocket 25 in a figure-eight pattern whereby the driving or tight side of the chain enters the top side of drive sprocket 15 and leaves the bottom side of driven sprocket 25, moving in the direction of the arrows 26.

Chain 19 is guided and separated at its cross-over point so that it does not rub or strike against itself by means of a guide wheel 30 which is journalled for rotation on a pin 31, threaded at one end, which is secured to a mounting bracket 32 by a nut 33. Bracket 32 is rigidly secured to the front of the wagon by bolts 34. The periphery of wheel 30 which has projecting means 30a thereon moves in the same direction as chain travel therearound with a minimum of rubbing and consequent wear.

Figure 5:
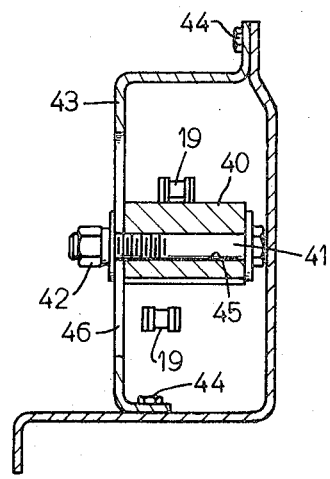
FIG. 5 is a cross-section view taken on line 5—5 of FIG. 2 and showing the clamping or tightening block for the discharge conveyor drive chain.

Chain 19 is properly tensioned by an adjustable clamping or tightening block 40 which is rigidly secured by means of a bolt 41 and nut 42 to a mounting bracket 43. Bracket 43 is rigidly secured to the front of the wagon by bolts 44. As FIG. 5 shows, bolt 41 extends through a hole 45 in block 40 and through an elongated vertical slot 46 in bracket 43 and, therefore, the block can be moved upwardly or downwardly to desired positions. FIG. 5 shows block 40 bearing against the undersurface of the top side of chain 19. FIG. 2 shows that the top surface of block 40 is chamfered to reduce friction between it and chain 19.

Conveyor 6 is in operation whenever power is applied to rotate power input shaft 11.

As FIGS. 1, 2 and 6 show, power transmission drive chain 20 runs around power transmission drive sprocket 16 and around a power transmission driven sprocket 50 in a conventional manner. Chain 20 is properly tensioned by a tensioning sprocket 51 which engages the chain and is journalled for rotation on a pin or bolt 52 carried on a support bracket 53 secured to the front of the wagon by bolts 54. The bolts 54 extend through slots 55 in bracket 53 and enable the bracket to be adjusted upwardly or downwardly to tension chain 20. Driven sprocket 50 is mounted for free-wheeling rotation on a beater drive shaft 60.

Driven sprocket 50 and beater drive shaft 60 are part of the mechanism which furnishes drive power to beater 4 and main conveyor 5. It is to be understood that when power is being supplied to power input shaft 11, discharge conveyor 6 is always in operation (at constant low speed) whereas the equipment operator can choose (by operation of manual control means) whether or not to run beater 4 and main conveyor 5 (which operate simultaneously) and can also choose any one of three speeds (low, sweep and high) at which the main conveyor 5 runs. The beater 4, when in operation, only runs at constant low speed. The term "constant speed" as used herein means a low speed directly proportional to the speed at which drive shaft 11 is being driven, which speed may in fact vary with tractor power take-off speed.

FIGS. 1 and 6 show that beater drive shaft 60 is mounted for rotation on bearings 61 and 62 which are carried on support plates 63 and 64, respectively, which extend outwardly from side 2 of the machine. A main conveyor drive shaft 65 is located below shaft 50 and is mounted for rotation on bearings 66 and 67 which are carried on the support plates 63 and 64, respectively. Beater drive shaft 60 is connected to the input shaft of a beater drive transmission 70 which is secured to side 2 of the machine and has its output side shaft connected to beater 4. Main conveyor drive shaft 65 is connected to the input shaft of a main conveyor drive transmission 71 which is secured to side 2 of the machine and has its output shaft connected to main conveyor 5.

Figure 8:
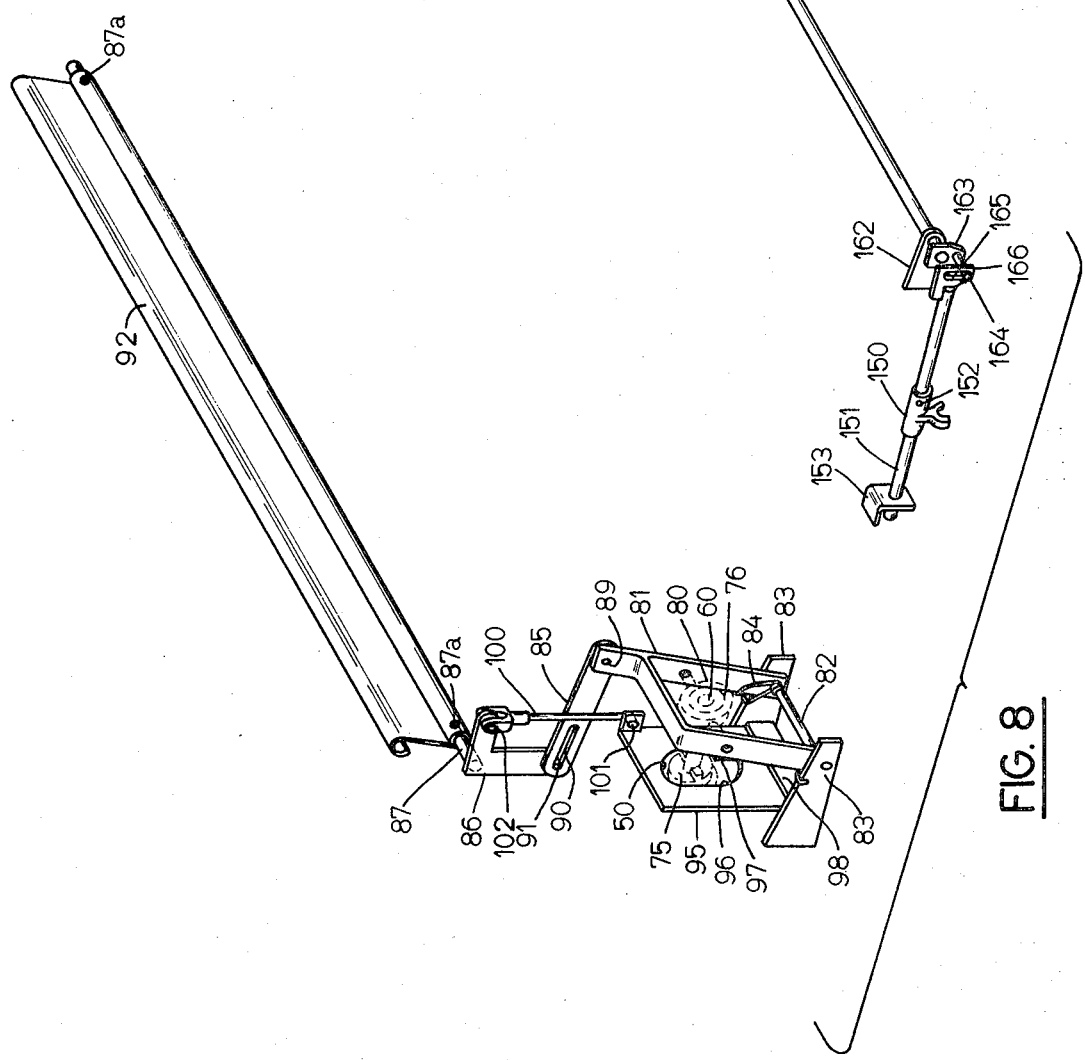
FIG. 8 is an exploded perspective view of the manual control linkage.

Referring to FIGS. 1, 6, 7 and 8, drive sprocket 50 is adapted to free-wheel on beater drive shaft 60. Sprocket 50 is provided with a jaw clutch member 75 which is adapted to be engaged by a mating jaw clutch member 76 which is slideably or axially movable on shaft 60 and is secured to the shaft by a key 77 in a slot 78 so as to effect rotation of shaft 60. Jaw clutch 76 is part of a manually operated "on-off" clutch or manual control which operates to effect operation or non-operation of beater 4 and main conveyor 5. Thus, when clutch 76 is axially moved into engagement with clutch 75 of sprocket 50, as shown in FIG. 7, rotation of shaft 60 is effected. When clutches 76 and 75 are disengaged, as shown in FIG. 6, shaft 60 ceases to rotate. As FIG. 8 shows, clutch 76 is journalled for rotation in a bearing 80 which is trunnion-mounted on a yoke 81. Yoke 81 is pivotably mounted on a pin 82 supported on brackets 83 which are rigidly attached to support plate 64. A biasing spring 84 is provided on pin 82 to bias yoke 81 toward a position wherein the clutches 75 and 76 are disengaged. Yoke 82 is pivotably movable into either clutch-engaged (on) position or clutch-disengaged (off) position by means of a linkage which includes a link 85, a bell crank 86, a shaft 87, and a sheet metal safety bar operating handle 92. Link 85 is pivotably connected at one end to the upper end of yoke 81 by a pivot pin 89 and is provided at its other end with a slot 90 which engages a sliding pin 91 on the lower arm of bell crank 86. Bell crank 86 is rigidly secured as by welding to one end of shaft 87 and is rotatable therewith when shaft 87 is rotated by manually pushing or pulling on safety bar 92, after releasing a safety bar latch 88 shown in FIG. 13. Safety bar handle 92 is secured to shaft 87 by bolts 87a.

Figure 13:
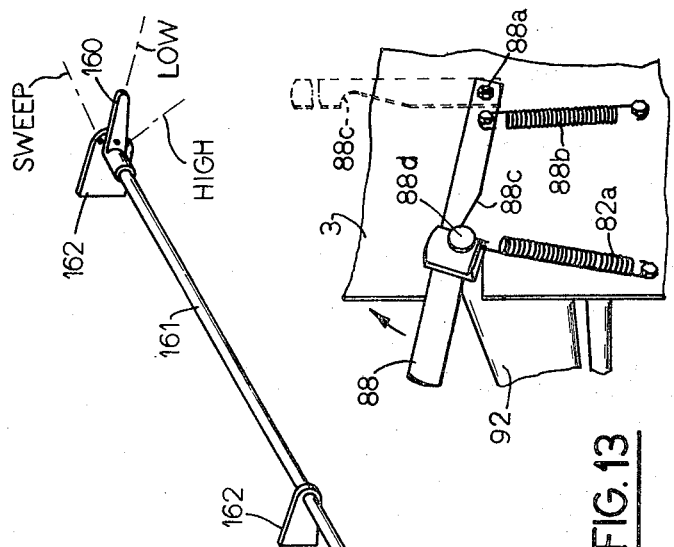
FIG. 13 is a view taken on line 13—13 of FIG. 1 showing the safety bar latch.

As FIG. 13 shows, safety bar 92 is normally biased into clutch-engaged position by a biasing spring 82a and can be latched in disengaging position by safety bar latch 88 which is pivotally mounted on side 3 by a bolt 88a and provided with a biasing spring 88b. Latch 88 is provided with notch 88c for engagement with an extension 88d on safety bar 92 to prevent forward (clutch-engage)movement of the safety bar unless the latch is released.

Power shift means are provided to cause power disengagement of the on-off clutches 75 and 76 and comprise a plate 95 having an aperture 96 therein to accommodate clutch member 75 and a projection or cam surface 97 thereon which extends beyond the mating surface of clutch member 75. Plate 95 is slideable vertically between two spaced apart support plates 98 secured between the brackets 83 and is movable by a tie rod 100 which has its lower end pivotably connected to plate 95 by a pin 101 and has its upper clevis end pivotably connected by a clevis pin 102 to the end of the upper arm of bell crank 86. As FIGS. 6 and 7 show, pivotal movement of bell crank 86 effected by manual movement of safety bar 92 causes plate 95 to move vertically and move projection 97 in proper position with respect to clutch members 75 and 76. The opening 96 of plate 95 is of such a size that it nests over clutch member 75 and the plate lies against the inner face of member 75. The hub of the clutch member 76, however, is slightly larger than the diameter of clutch member 75. The cam surface 97 is so shaped that is complements the radial slop of the jaws of the sliding clutch member 76. Consequently, there is a rotational position of the engaged clutch member 75 and the sliding clutch member 76 at which the cam 97 will axially nest between the face of member 75 and the sloping jaws of the sliding clutch of member 76. The rotation of the engaged clutch members 75 and 76 causes the jaws of the sliding clutch 76 to climb the cam surface 97, and consequently forces the sliding clutch 76 axially away from the member 75 thereby providing disengagement of the jaws of the clutch. Thus, there is a power shifting due to the driving effect of shaft 60 of the clutch to the disengaged position.

As hereinbefore explained, when the on-off clutch is engaged, beater drive shaft 60 and beater 4 operate at constant speed, i.e., a speed proportional to the speed of power input shaft 11.

Means are provided to enable main conveyor drive shaft 65 and main conveyor 5 to be driven at any one of three speeds (constant low, sweep or high speed), while beater drive shaft 60 is operating at constant speed. Referring to FIGS. 1, 6, 9, 10 and 11, such means comprise three separate power transmitting means 110, 111 and 112 each comprising a flexible endless chain and sprockets, (for constant, sweep and high speed operation, respectively) which are interconnected between beater drive shaft 60 and main conveyor driven shaft 65. Such means further comprise a speed selector clutch mechanism 113 and manual control or operating means for the clutch mechanism 113.

Power transmitting means 110 for constant low speed operation of main conveyor drive shaft 65 comprises a drive sprocket 115 which is secured on shaft 60 by a key (not shown) and a set screw 116; a driven sprocket 117 which is equipped with an overrunning or one-way clutch 118 and mounted on shaft 65 (shown in FIG. 11); and a drive chain 119 around the sprocket 115 and 117.

Power transmitting means 111 for sweep speed operation of main conveyor drive shaft 65 comprises a drive sprocket 120 which is freely rotatable on shaft 60 and has a clutch jaw element 121 secured thereto; a driven sprocket 122 which is secured on shaft 65 by key (not shown) and a set screw 123; and a drive chain 124 around the sprockets 120 and 122.

Power transmitting means 112 for high speed operation of main conveyor drive shaft 65 comprises a drive sprocket 130 which is freely rotatable on shaft 60 and has a clutch jaw element 131 secured thereto; a driven sprocket 132 which is secured on shaft 65 by a key (not shown) and a set screw 133; and a drive chain 134 around the sprockets 130 and 132.

Figure 11:
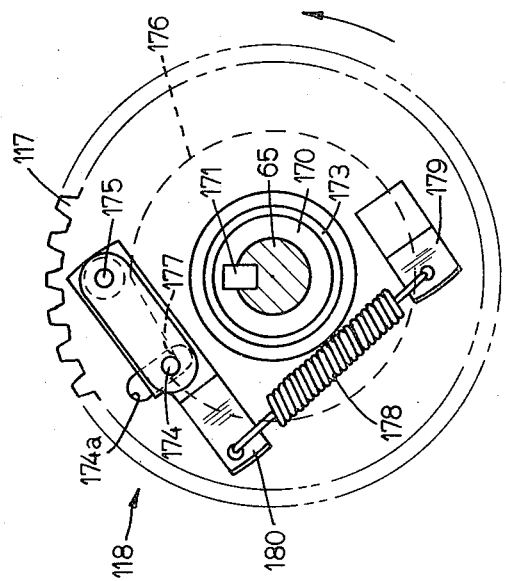
FIG. 11 is a plan view of an overrunning clutch shown in FIGS. 1, 6, 9 and 10.
Figure 12:
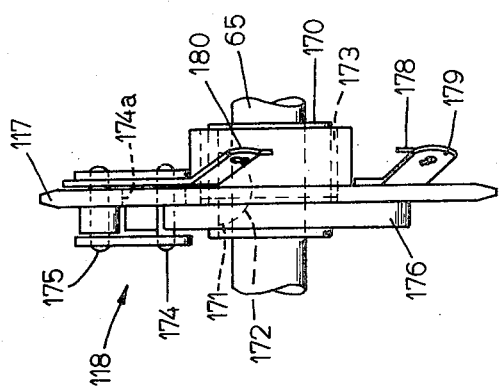
FIG. 12 is an edge view of the clutch shown in FIG. 11.

As FIGS. 11 and 12 show, overrunning clutch 118 comprises a hub 170 which is secured to shaft 65 by a key 171 in a slot 172. Hub 170 has a ratchet wheel 176 rigidly secured thereto. Driven sprocket 117 is rotatably mounted on hub 170 on a bearing 173. A pawl 174 is pivotably mounted in a slot 174a in sprocket 117 by a pin 175 and is adapted to engage a notch 177 in ratchet wheel 176. A biasing spring 178 is connected between a plate 180 attached to pawl 174 and a bracket 179 secured to the side of sprocket 117. When sprocket 117 is being driven at constant speed by chain 119, the tension of spring 178 is sufficient to keep pawl 174 engaged with notch 177 and, therefore, driving force is transmitted from sprocket 117 to hub 170 and, thus, to shaft 65. However, when either drive chain 124 or 134 drives shaft 65 and hub 170 at a rate of speed faster than they were being driven by sprocket 117, the notch 177 moves away from pawl 174. As a consequence, hub 170 is not driven by sprocket 117 but is driven by shaft 65 instead of driving shaft 65.

Figure 10:
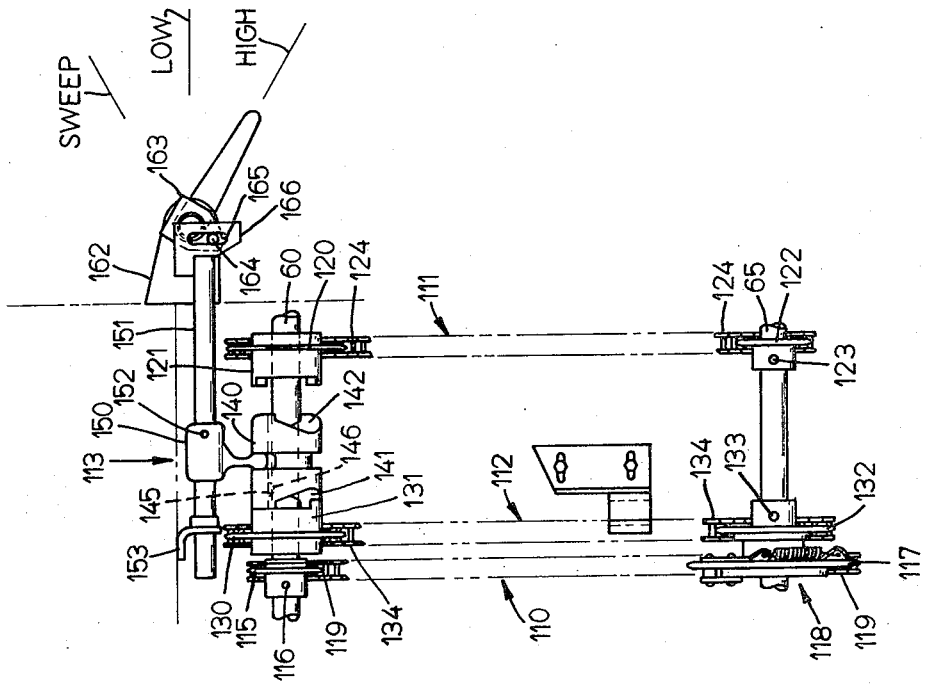
FIG. 10 is a view similar to FIG. 9 showing the clutch engaged in high position.
Figure 9:
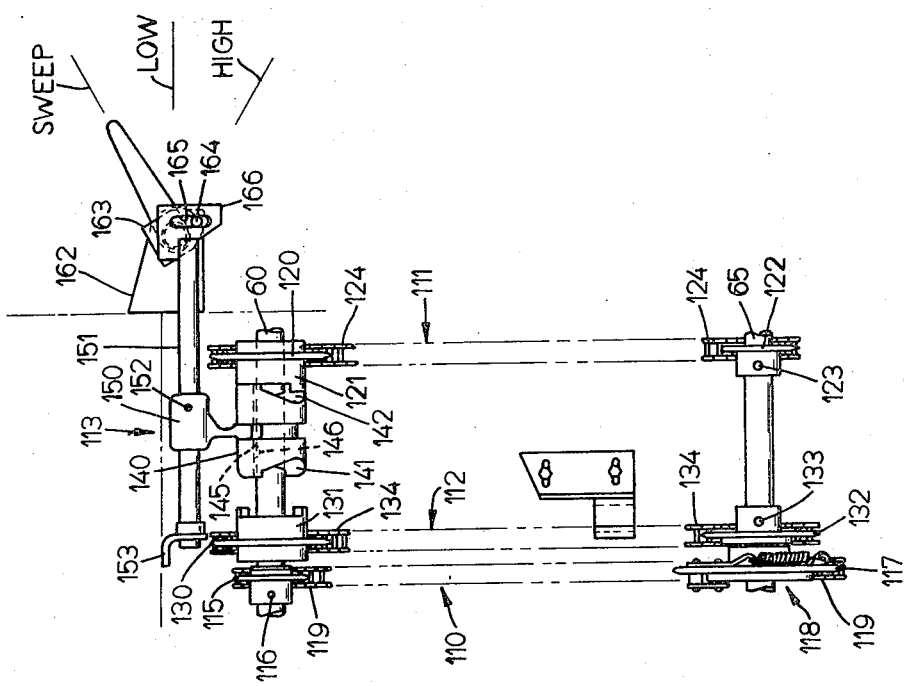
FIG. 9 is a side view of a portion of the drive mechanism of FIG. 6 showing the clutch engaged in sweep position.

The speed selector clutch mechanism 113 comprises a clutch member 140 which is axially slidable on shaft 60 and provided at its opposite ends with clutch teeth 141 and 142 for engagement with either element 131 or element 121, respectively, as FIGS. 10 and 9, respectively, show. Clutch member 140 is secured to shaft 60 for rotation therewith by means of a key 145 which engages a slot 146 in shaft 60. Clutch member 140 is provided with a groove 148 around its periphery in which a shifter yoke 150 rides. Shifter yoke 140 is secured to an axially movable shaft 151 for axial movement therewith by a pin 152. Shaft 151 is supported for axial sliding movement on a bracket 143 on side 2 of the machine and extends through a hole 154 in side member 64.

Clutch member 140 is selectively movable to: neutral position (FIG. 6) wherein power transmitting means 110 drives shaft 65 at constant speed; sweep position (FIG. 9) wherein power transmitting means 111 drives shaft 65 at sweep speed; and high position (FIG. 10) wherein power transmitting means 112 drives shaft 65 at high speed. As FIG. 8 shows, such movement of clutch member 140 is effected by corresponding pivotal movement of a manual operating handle 160 which is connected to one end of a shaft 161 rotatably supported on bracket 162 on the front end of the wagon. The other end of shaft 161 is provided with a rigidly secured offset arm 163 having a pin 164 engaged in a vertical slot 165 in an attachment member 166 secured to the end of shaft 151. Rotation of operating handle 160 to any of its three positions (constant low, sweep or high) effects axial movement of shaft 151 and yoke 150 thereon to the corresponding position.

Referring to FIGS. 9 and 10, when clutch member 140 is moved along shaft 60 to mesh its surfaces 141 or 142 with those on the clutch jaw elements 131 or 121 of one of the adjacent sprockets 120 or 130, the engaged sprocket is forced to turn at the same speed as shaft 60. This sprocket then controls the speed of the three-speed driven shaft 65, while the other sprocket opposite clutch 140 is forced to idle at a speed governed by its connecting ratio to the three speed shaft 65. Because the sprockets 120 and 130 adjacent to the speed selector clutch 140 control the two highest speeds of the three speed shaft 65, the third speed driven sprocket 117 is equipped with overrunning or one way clutch 118 which has its driver sprocket 115 keyed solidly to the constant speed shaft 60. When the speed selector clutch member 140 is engaged with neither of its adjacent sprockets, as shown in FIG. 6, the three speed shaft 65 is driven by the low speed driver sprocket 115 through the one way clutch 118. When the speed selector clutch member 140 engages one of its mates, the three speed shaft 65 is driven faster, thereby disengaging the one way clutch 118 and causing the driven ratchet wheel 176 to overrun its driving pawl 174.

RESUME

A self-unloading forage wagon has one or more beaters 4, a main conveyor 5 and a discharge or cross conveyor 6 which are driven from a power input shaft 11 to forceably discharge material from the wagon. The power input shaft 11 is driven by a power take-off shaft of a tractor. In accordance with one aspect of the present invention, the discharge conveyor 6 is driven by a first drive chain 19 arranged in the form of a figure-eight and connected between a first drive sprocket 17 on the power input shaft 11 and a driven sprocket 25 on the discharge conveyor 6. Arrangement of the first drive chain 19 in the form of a figure-eight provides for necessary direction reversal between a conventional tractor power take-off shaft and the desired direction of the discharge or cross conveyor 6. In accordance with another aspect of the invention, the beater 4 and main conveyor 5 are driven by a second drive chain 20 connected between a second driven sprocket 16 on the power input shaft 11 and a driven sprocket 50 which is part of a speed selector mechanism. The speed selector mechanism comprises a beater drive shaft 60 which can run at constant speed (constant with respect to tractor power take-off speed) and a main conveyor drive shaft 65 which can run at any of three selected speeds (constant, sweep or high speed). The aforesaid driven sprocket 50 free-wheels on the beater drive shaft 60 until it is selectively engaged by means of a manually operable on-off mechanism, including a safety bar 92, to rotate the beater drive shaft 60 at constant speed. Three separate power transmitting means 110, 111 and 112, each comprising a flexible endless chain and sprockets, are interconnected between the beater drive shaft 60 and the main conveyor drive shaft 65 and are alternatively operable by means of a manually operable three-speed selector clutch 113 which has constant, sweep and high positions. With the speed-selector clutch 113 in constant position, power transmitting means 110, which comprises an overrunning clutch 118, drives the main conveyor shaft 65 and conveyor 5 at constant speed. With the speed-selector clutch 113 in either sweep or high speed position, the overrunning clutch 118 in power transmitting means 110 automatically disengages, and the main conveyor shaft 65 and conveyor 5 are driven at either sweep speed or high speed, whichever is selected, while the beater 4 is still driven at constant speed by shaft 60.

We claim:

1. In a self-unloading wagon having driven components comprising at least one rotatable beater, a main conveyor and a discharge conveyor, a power input drive shaft for supplying drive power to said components, the axis of said shaft being transverse to the direction of movement of said discharge conveyor, first means including a first chain for driving said discharge conveyor, said first chain being connected around a first sprocket on said drive shaft and a sprocket on said discharge conveyor in figure-eight configuration, second means selectively operable to drive said beater and to simultaneously drive said main conveyor at any one of a plurality of speeds, said second means comprising a second chain connected around a second sprocket on said drive shaft and a third sprocket comprising part of said second means, said second means further comprising a beater drive shaft and a main conveyor drive shaft for driving said beater and main conveyor, respectively, said third sprocket being freely rotatable on said beater drive shaft, a plurality of selectively operable power transmitting means connected between said beater drive shaft and said main conveyor drive shaft, first releasably engageable clutch means to drive said beater shaft from said third sprocket to rotate said beater, and second releasably engageable clutch means to effect driving of said main conveyor shaft from said beater shaft by means of one of said power transmitting means.

2. A wagon according to claim 1 wherein one of said power transmitting means comprises an overrunning clutch and wherein said one power transmitting means drives said main conveyor shaft whenever first clutch means are engaged unless said second clutch means are engaged to operate another of said power transmitting means.

3. A wagon according to claim 2 including first and second manually operable means to selectively operate said first and second clutch means, respectively.

4. In a self-unloading wagon having a conveyor and at least one other drivable component, a power input drive shaft for supplying drive power to said conveyor and said other drivable component, a first bracket on said wagon and on which said shaft is rotatably mounted, the axis of said shaft being transverse to the direction of movement of said conveyor, said first bracket being adjustably movable in directions transverse to the axis of said shaft, at least two sprockets on said shaft, a sprocket on said conveyor, a sprocket on said other component, a first drive chain connected around one sprocket on said shaft and said sprocket on said conveyor in figure-eight configuration and defining a cross-over point, a second drive chain connected around the other sprocket on said shaft and said sprocket on said other component, a rotatable guide wheel on said wagon at a position near the cross-over point of said first drive chain, said guide wheel having a peripheral surface engaged by oppositely movable portions of said first drive chain, said guide wheel further having projecting means on said peripheral surface for laterally separating said oppositely movable portions of said first drive chain, and an adjustable chain tightening block on said wagon and engageable with said first drive chain, said block being adjustably movable in a direction transverse to the direction of movement of said first drive chain.

5. A wagon according to claim 4 wherein said block is rigidly mounted on a bracket on said wagon, and wherein said block is adjustably movable on said bracket.

6. In a self-unloading wagon having a beater and a conveyor, a beater drive shaft for driving said beater, means to drive said beater drive shaft, a conveyor drive shaft for driving said conveyor, a plurality of power transmitting means connected between said beater drive shaft and said conveyor drive shaft, one of said power transmitting means comprising an overrunning clutch, and releasably engageable clutch means to effect driving of said conveyor drive shaft by said beater drive shaft through one of said power transmitting means, said conveyor drive shaft being driven by said one power transmitting means unless said clutch means are engaged to operate another of said power transmitting means.

7. A wagon according to claim 6 wherein each of said power transmitting means comprises a first sprocket on said beater shaft, a second sprocket on said conveyor shaft, and an endless flexible drive chain therebetween; wherein the first sprocket for said one power transmitting means is rotatable with said beater shaft; wherein the first sprockets for the other power transmitting means have clutch jaws thereon and are freely rotatable on said beater shaft; wherein the second sprocket for said one power transmitting means is connected to said overrunning clutch on said conveyor shaft; wherein the second sprockets for said other power transmitting means are rotatable with said conveyor shaft; and wherein said clutch means comprises a jaw clutch member rotatable with said beater shaft and axially slideable thereon into releasable engagement with the clutch jaws of the first sprockets of the other power transmitting means.

8. A wagon according to claim 7 wherein said means to drive said beater drive shaft comprises:

a power input shaft on said wagon, a drive sprocket on said power input shaft, a driven sprocket rotatably mounted on said beater drive shaft, a drive chain connected between said drive sprocket and said driven sprocket, and second releasably engageable clutch means to connect said driven sprocket to drive said beater shaft.

* * * * *